(12) United States Patent
Lakare et al.

(10) Patent No.: US 7,609,876 B2
(45) Date of Patent: Oct. 27, 2009

(54) VIRTUAL GRID ALIGNMENT OF SUB-VOLUMES

(75) Inventors: Sarang Lakare, Malvern, PA (US); Luca Bogoni, Philadelphia, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 678 days.

(21) Appl. No.: 11/255,263

(22) Filed: Oct. 21, 2005

(65) Prior Publication Data

US 2006/0159346 A1 Jul. 20, 2006

Related U.S. Application Data

(60) Provisional application No. 60/621,198, filed on Oct. 22, 2004.

(51) Int. Cl.
*G06K 9/00* (2006.01)
(52) U.S. Cl. ............... 382/154; 382/128; 382/131; 382/190
(58) Field of Classification Search ............... 382/128, 382/130, 131, 132, 154, 190
See application file for complete search history.

(56) References Cited

U.S. PATENT DOCUMENTS

| | | | |
|---|---|---|---|
| 5,840,029 A * | 11/1998 | Mazess et al. | 600/437 |
| 6,016,439 A * | 1/2000 | Acker | 600/411 |
| 6,128,522 A * | 10/2000 | Acker et al. | 600/411 |
| 6,144,383 A | 11/2000 | Lichtenbelt et al. | |
| 6,280,387 B1 * | 8/2001 | Deforge et al. | 600/454 |
| 6,335,765 B1 * | 1/2002 | Daly et al. | 348/586 |
| 6,574,297 B2 * | 6/2003 | Tam | 378/15 |
| 6,750,974 B2 * | 6/2004 | Svetkoff et al. | 356/602 |
| 7,034,272 B1 * | 4/2006 | Leonard et al. | 250/208.1 |

OTHER PUBLICATIONS

"Volume Visualization and Volume Rendering Techniques", Meissner et al., Online, 2000, pp. 1-36, htto://www.gris.uni-tuebingen.de/people/staff/meissner/tutorials/tutorial.pdf.
International Search Report including Notification of Transmittal of the International Search Report, International Search Report and Written Opinion of the International Searching Authority, PCT Appln. No. PCT/US2005/038409, mailed Feb. 20, 2006.

* cited by examiner

*Primary Examiner*—Yosef Kassa

(57) ABSTRACT

A computer-implemented method for aligning sub-volumes includes receiving a data volume, providing a plurality of parameters of the sub-volumes, and determining a start point of each of the two or more sub-volume according to the plurality of parameters. The method further includes determining an amount of mis-alignment of the two or more sub-volumes, and shifting a start point of each sub-volume to align the start points with a grid of a virtual volume. The method may include determining a feature in the two or more sub-volumes, which have been aligned. The method may include visualizing the aligned sub-volumes.

19 Claims, 4 Drawing Sheets

VIRTUAL GRID ALIGNMENT OF SUB-VOLUMES

This application claims priority to U.S. Provisional Application Ser. No. 60/621,198, filed on Oct. 22, 2004, which is herein incorporated by reference in its entirety.

BACKGROUND OF THE INVENTION

1. Technical Field

The present invention relates to image analysis, and more particularly to a system and method for volume sampling.

2. Discussion of Related Art

Processing of data to determine a feature value or to generate new data is typically done on a sub-volume rather than the entire volume of data, e.g., a 3-dimensional computed tomography (CT) scan. Typically the sub-volumes are extracted from the original volume in such a way that the sampling frequency of the sub-volumes does not match that of the original volume. For example, some algorithms might require the sub-volumes to be isotropic whereas the original volume might not be isotropic or be isotropic at a different resolution. In such cases, the sub-volume is extracted from the original volume by sampling the original volume at a given sampling frequency. Due to this sampling the voxels in the original volume do not have a one-to-one correspondence to the voxels in the sub-volume.

When multiple sub-volumes are extracted from an original volume, the sub-volumes typically overlap. FIG. 1 shows an example of overlap. The original volume is shown as a border 101. Two sub-volumes 102 and 103 are extracted from this volume. Assume that the algorithm processing the sub-volumes is extracting a feature on a region-of-interest (ROI) 104. This region of interest 104 can be common to the two overlapping sub-volumes 102 and 103 as shown in FIG. 1. Ideally, a determined feature value for two or more sub-volumes should be identical if they include identical portions of a ROI inside them. Similarly, when the identical portions of the ROI inside the sub-volumes are visualized, they should look identical.

In practice the feature value computed on the two sub-volumes may differ and the visualization of the two sub-volumes may look different. The reason for the difference is as follows. When a first sub-volume is extracted, the original volume is sampled to get a desired sampling frequency of the sub-volume. When a second sub-volume is extracted, the sampling process is repeated. By observing the sample locations of the two sub-volumes inside the original volume, it can be determined that the sample locations for both of the sub-volumes do not match in the area where they overlap. For example, see FIG. 2 in which sample locations for the first and second sub-volumes 202 and 203, respectively, are equidistant, but do not match. As a result, the voxel values in the common region of the two sub-volumes differ. This difference in voxel values results in difference in the determined feature value.

FIG. 2 shows sampling locations of two overlapping sub-volumes. The lines 201 represent locations of the original samples, the lines 202 represent the sample locations of the first sub-volume and the lines 203 represent the sample locations for the second sub-volume. It can be observed that the sample locations of the two sub-volumes 202 and 203 do not match. This leads to feature values that are not identical for the two sub-volumes.

Therefore, a need exists for a system and method for synchronized sampling of multiple sub-volumes wherein the sampling locations are identical in the area where the sub-volumes are overlapping.

SUMMARY OF THE INVENTION

According to an embodiment of the present disclosure a computer-implemented method for aligning sub-volumes for feature extraction includes receiving a data volume, providing a plurality of parameters of the sub-volumes, and determining a start point of each of the two or more sub-volume according to the plurality of parameters. The method further includes determining an amount of mis-alignment of the two or more sub-volumes, shifting a start point of each sub-volume to align the start points with a grid of a virtual volume, and determining a feature in the two or more sub-volumes, which have been aligned.

Providing the plurality of parameters includes selecting a center point of each of two or more sub-volumes, selecting a size and a shape of the two or more sub-volumes, and selecting a spacing between voxels in the two or more sub-volumes. The method further includes converting the voxel-spacing to volume units. The method includes extracting the two or more sub-volumes from the volume, prior to extracting the feature, using the start points and the voxel spacing in volume units.

Determining the start point of each of the two or more sub-volume is performed according to the center point, the sub-volume and the voxel-spacing.

The amount of mis-alignment is determined with respect to the grid of the virtual volume, wherein a spacing of the virtual volume grid is the spacing between voxels of the sub-volume, and an origin of the grid of the virtual volume coincides with an origin of a world coordinate system.

The method includes converting shifted start points to volume coordinates with a (0,0,0) position of each sub-volume as the origin. The two or more sub-volumes may have different resolutions and the data volume may include two or more data volumes representing different modalities.

Shifting the start points is performed only with respect to one or two axes of the sub-volumes. The sub-volumes may be two-dimensional and the visualization as well as the features are determined on the two-dimensional sub-volumes. An alignment of the start points is determined on three or more dimensions. In case of multi-dimensional volume, the method includes selecting one or more dimensions, wherein an alignment of the start points is determined on the selected dimensions. In case of multi-modality volume, an alignment of the start points is applied to across different modalities that have been pre-registered.

According to an embodiment of the present disclosure, a program storage device is provided readable by machine, tangibly embodying a program of instructions executable by the machine to perform method steps for aligning sub-volumes for feature extraction. The method steps includes receiving a data volume, providing a plurality of parameters of the sub-volumes, and determining a start point of each of the two or more sub-volume according to the plurality of parameters. The method further includes determining an amount of mis-alignment of the two or more sub-volumes, shifting a start point of each sub-volume to align the start points with a grid of a virtual volume, and determining a feature in the two or more sub-volumes, which have been aligned.

According to an embodiment of the present disclosure, a computer-implemented method for aligning sub-volumes for visualization includes receiving a data volume, providing a plurality of parameters of the sub-volumes and determining a start point of each of the two or more sub-volume according to the plurality of parameters. The method includes determining an amount of mis-alignment of the two or more sub-volumes, shifting a start point of each sub-volume to align the start points with a grid of a virtual volume, and displaying the sub-volumes having aligned start points, wherein a region of interest in each sub-volume has identical voxel values.

Providing the plurality of parameters includes selecting a center point of each of two or more sub-volumes, selecting a size and a shape of the two or more sub-volumes, and selecting a spacing between voxels in the two or more sub-volumes. The method includes converting the voxel-spacing to volume units. The method includes extracting the two or more sub-volumes from the volume, prior to displaying the sub-volumes, using the start points and the voxel spacing in volume units.

According to an embodiment of the present disclosure, a program storage device is provided readable by machine, tangibly embodying a program of instructions executable by the machine to perform method steps for aligning sub-volumes for visualization. method for aligning sub-volumes for visualization includes receiving a data volume, providing a plurality of parameters of the sub-volumes and determining a start point of each of the two or more sub-volume according to the plurality of parameters. The method includes determining an amount of mis-alignment of the two or more sub-volumes, shifting a start point of each sub-volume to align the start points with a grid of a virtual volume, and displaying the sub-volumes having aligned start points, wherein a region of interest in each sub-volume has identical voxel values.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present disclosure, a system and method for extracting sub-volumes having substantially identical feature values determined for multiple sub-volumes with overlapping regions assumes that an overlapping region covers an entire region-of-interest (ROI), e.g., a nodule, on which the feature is being determined. The system and method synchronize the sampling of multiple sub-volumes, wherein the sampling locations are substantially identical in the area where the sub-volumes overlap.

Figure 3:
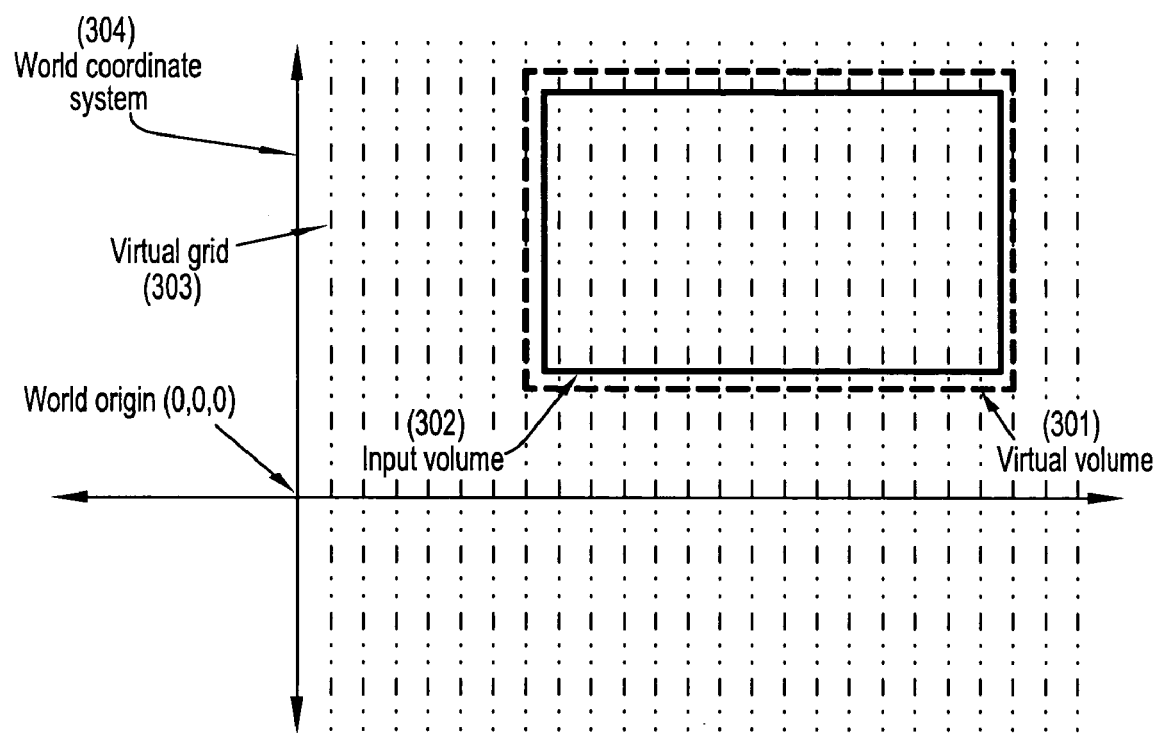
FIG. 3 is an illustration of an input volume on a virtual grid according to an embodiment of the present disclosure.

Referring to FIG. 3, a virtual volume 301 is created by sampling an original input volume 302 on a virtual grid 303. The origin (0,0,0) of the virtual grid 303 coincides with that of a world coordinate system 304. Further, grid spacing is substantially the same as a requested grid spacing of the sub-volumes. The requested sub-volumes are extracted from the virtual volume 301. Since there is no further sampling of the virtual volume 301, the voxels in the region where the sub-volumes overlap are substantially identical.

The virtual volume need not be created, so as to save memory resources. The requested sub-volumes, aligned to the virtual volume grid, can be extracted directly from the original volume. If it is determined that there is enough memory available, then the virtual volume can be created and the sub-volumes can be extracted from the virtual volume. By using a virtual volume, which does not resample the entire original volume, a method according to an embodiment of the present disclosure allows for a high sampling frequency for the sub-volumes. This can increase the efficiency and accuracy of the processing of the sub-volumes.

Figure 4:
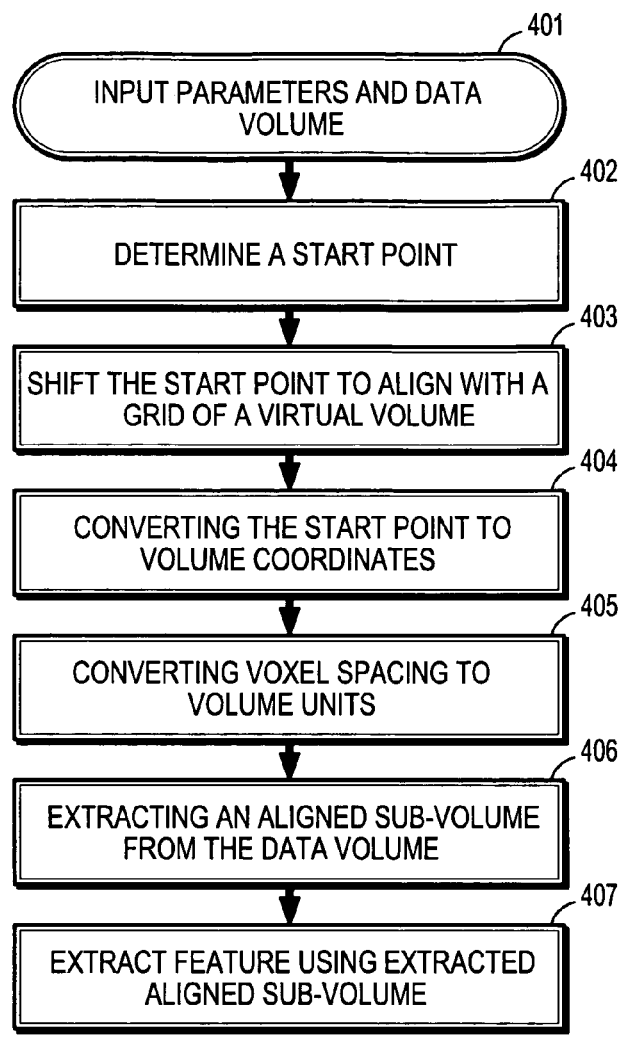
FIG. 4 is an illustration of sample locations for sub-volumes that are identical in the area where two sub-volumes overlap according to an embodiment of the present disclosure.

Referring to FIG. 4, input is supplied 401 including a data volume and a plurality of parameters that define a sub-volume to be extracted. The parameters include the center point ($C_w$) in the world coordinate system, and a requested sub-volume size ($D_w$) and voxel-spacing ($Vs_w$) of the sub-volume, for example, expressed in coordinates. The parameters may be supplied by a user or may be predetermined. Using the center point, the sub-volume size, and the voxel-spacing, a start point of the sub-volume $S_w$ in world coordinate system is determined 402:

$$S_w = C_w - D_w * Vs_w$$

A start point of the sub-volume is shifted to align it with the grid of the virtual volume 403, for example, expressed as follows:

$$\Delta = S_w \bmod Vs_w$$

$$\text{If } (\Delta > Vs_w/2)$$

$$S_w = S_w + (Vs_w - \Delta)$$

else $$S_w = S_w - Vs_w$$

The determination aligns the start point of the sub-volume with the grid of the virtual volume. The spacing of the virtual volume grid $Vs_w$ is the same as that of the requested sub-volume. $\Delta$ is the amount of mis-alignment of the sub-volume with respect to the virtual volume grid. To reduce an amount of shifting of the start point, $\Delta$ is compared with ($Vs_w/2$). This limits the shifting to $+/-Vs_w/2$ from the original start point.

The start point is converted to volume coordinates with the (0,0,0) position of the original volume as the origin 404.

The requested voxel spacing is converted from millimeters to original volume units 405.

The sub-volume is extracted from the original volumes 406 using the start point and the voxel spacing in volume units determined in blocks 404 and 405. A feature may be determined on the data volume using the extracted (e.g., aligned) sub-volume 407.

Figure 1:
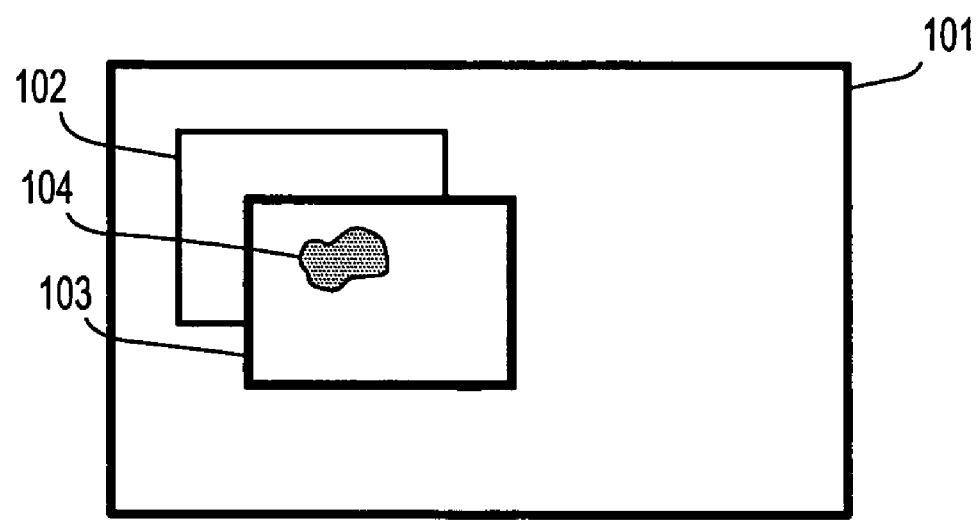
FIG. 1 is an illustration of shows overlapping sub-volumes extracted from a volume.
Figure 2:
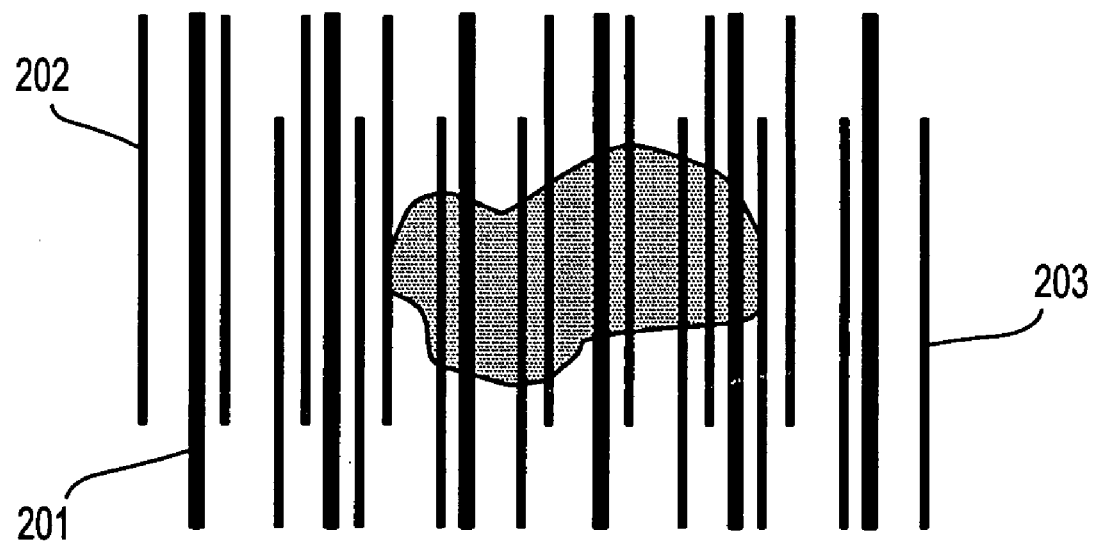
FIG. 2 is an illustration of sampling locations of two overlapping sub-volumes.
Figure 5:
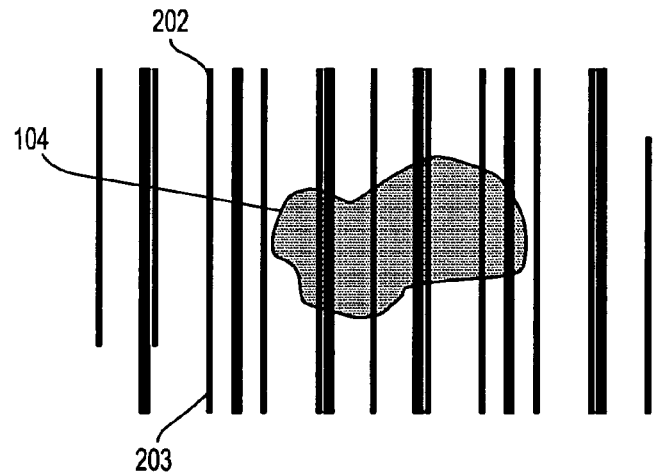
FIG. 5 is a flow chart of a method according to an embodiment of the present disclosure.

FIG. 5 is an illustration showing the sample locations for the sub-volumes being identical in the area where the two sub-volumes overlap. For simplicity, only vertical sampling lines are shown. In FIG. 5, a result is shown according to an embodiment of the present disclosure based on the case illustrated in FIG. 2. It can be observed that the sample locations in the original volume of the two sub-volumes 202 and 203 are identical. As a result, the voxels in the overlapping areas are the same between the sub-volumes that share that area.

Given the aligned sub-volume, any feature determined on the shared ROI 104 will be identical for the sub-volumes. This feature invariance is dependent on the locality of the ROI and is based on the assumption that voxels not in the shared ROI do not contribute to the feature computation and value and that the entire ROI is shared between the sub-volumes.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 6:
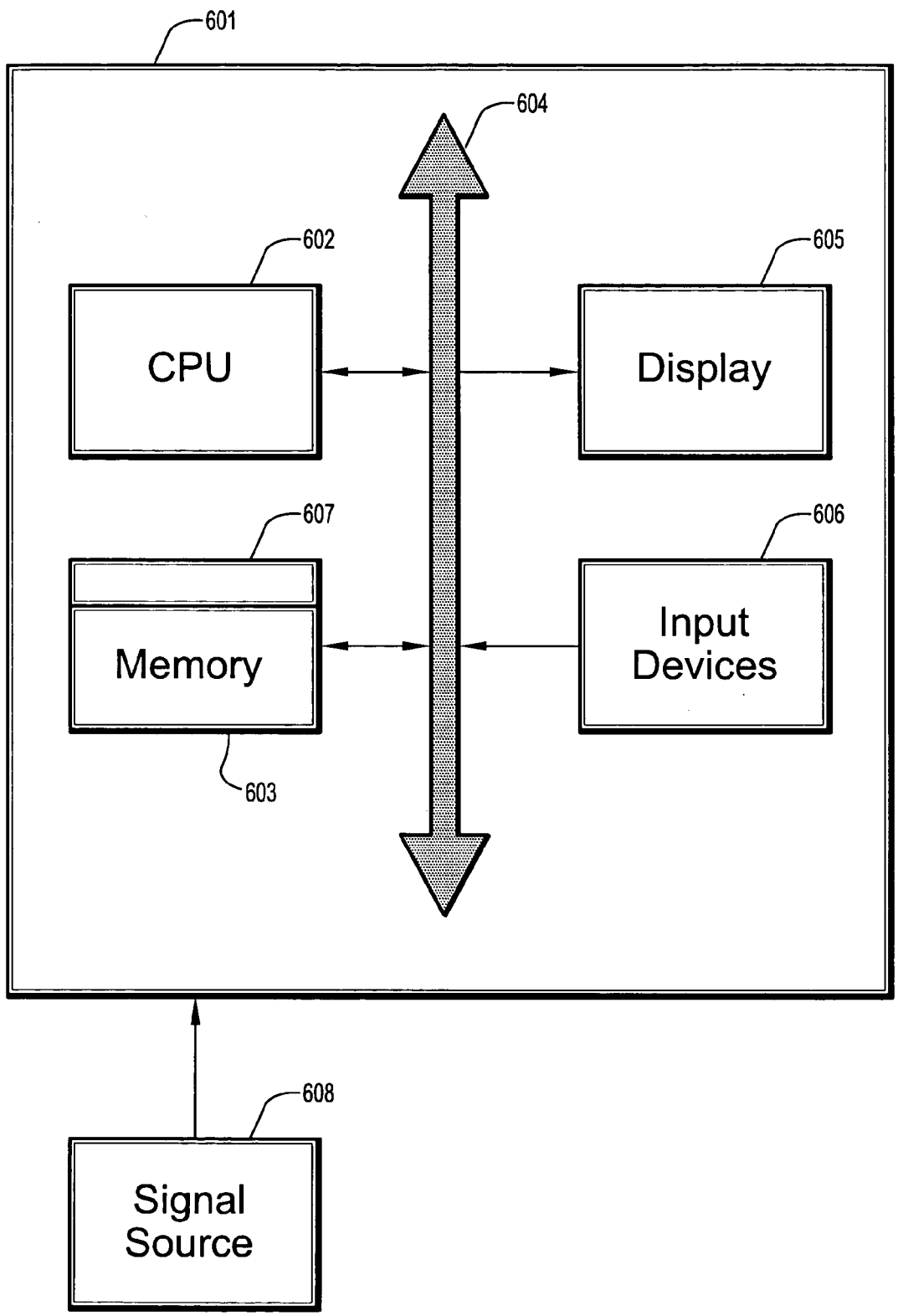
FIG. 6 is a diagram of a system according to an embodiment of the present disclosure.

Referring to FIG. 6, according to an embodiment of the present disclosure, a computer system 601 for implementing a method for synchronized sampling of multiple sub-volumes comprises, inter alia, a central processing unit (CPU) 602, a memory 603 and an input/output (I/O) interface 604. The computer system 601 is generally coupled through the I/O interface 604 to a display 605 and various input devices 606 such as a mouse and keyboard. The display 605 can display views of the virtual volume and registered images. The support circuits can include circuits such as cache, power supplies, clock circuits, and a communications bus. The memory 603 can include random access memory (RAM), read only memory (ROM), disk drive, tape drive, etc., or a combination thereof. The present invention can be implemented as a routine 607 that is stored in memory 603 and executed by the CPU 602 to process the signal from the signal source 608. As such, the computer system 601 is a general-purpose computer system that becomes a specific purpose computer system when executing the routine 607 of the present invention.

The computer platform 601 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Systems and methods described herein are well suited for a broad range of applications, for example, applications that process sub-volumes for determining features. Other example applications include Computer Aided Diagnosis (CAD) applications for various organs in a body.

The systems and methods described herein have been implemented in two applications: the measurement of colonic lesions; and feature detection in colon CAD.

In the measurement of colonic lesions, a user selects a click point that is used as a center point for an extraction of a sub-volume. This sub-volume is processed and a lesion in the sub-volume is automatically detected. Upon detecting the lesion, the size of the lesion is measured and reported to the user. The click point that is input to this application varies as the user is free to click anywhere around a lesion. As a result, multiple click points generate multiple sub-volumes. According to an embodiment of the present disclosure, the multiple sub-volumes would each return the same measurement for the lesion.

Similarly, for colon CAD, a sub-volume is extracted for various candidate locations inside the colon. For each sub-volume, features are determined. According to an embodiment of the present disclosure, the determined feature value does not change with subtle changes in the candidate locations. This results in more robust feature values.

Sub-volumes may be aligned that have been determined using different modalities: CT, magnetic resonance (MR), ultrasongraphy (US), Single Photon Emission CT (SPECT), and positron emission tomography (PET). Aligned sub-volumes may be implemented to extract a feature with substantially the same feature value, for example, decreasing false positives in a tumor detection method or increasing a precision of a feature detection method. According to an embodiment of the present disclosure, aligned sub-volume may be implemented for segmenting and processing various types of data, e.g., having different resolutions.

Having described embodiments for a system and method for synchronized sampling of multiple sub-volumes, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer readable medium embodying a program of instructions executable by a processor to perform method steps for aligning sub-volumes for feature extraction, the method steps comprising:
   receiving a data volume;
   providing a plurality of parameters of the sub-volumes;
   determining a start point of each of the two or more sub-volume according to the plurality of parameters;
   determining an amount of mis-alignment of the two or more sub-volumes;
   shifting a start point of each sub-volume to align the start points with a grid of a virtual volume; and
   determining a feature in the two or more sub-volumes, which have been aligned.

2. The computer readable medium of claim 1, wherein shifting the start points is performed only with respect to one or two axes of the sub-volumes.

3. The computer readable medium of claim 1, wherein the sub-volumes are two-dimensional.

4. The computer readable medium of claim 3, wherein the features are determined on the two-dimensional sub-volumes.

5. The computer readable medium of claim 1, wherein an alignment of the start points is determined on three or more dimensions.

6. The computer readable medium of claim 1, the method further comprising selecting one or more dimensions, wherein an alignment of the start points is determined on the selected dimensions.

7. The computer readable medium of claim 1, wherein an alignment of the start points is applied to across different modalities that have been pre-registered.

8. The computer readable medium of claim 1, wherein providing the plurality of parameters comprises:

selecting a center point of each of two or more sub-volumes;

selecting a size and a shape of the two or more sub-volumes; and selecting a spacing between voxels in the two or more sub-volumes.

9. The computer readable medium of claim 8, the method further comprising converting the voxel-spacing to volume units.

10. The computer readable medium of claim 8, the method further comprising extracting the two or more sub-volumes from the volume, prior to extracting the feature, using the start points and the voxel spacing in volume units.

11. The computer readable medium of claim 1, wherein determining the start point of each of the two or more sub-volume is performed according to the center point, the sub-volume and the voxel-spacing.

12. The computer readable medium of claim 1, wherein the amount of mis-alignment is determined with respect to the grid of the virtual volume, wherein a spacing of the virtual volume grid is the spacing between voxels of the sub-volume, and an origin of the grid of the virtual volume coincides with an origin of a world coordinate system.

13. The computer readable medium of claim 1, the method further comprising converting shifted start points to volume coordinates with a (0,0,0) position of each sub-volume as the origin.

14. The computer readable medium of claim 1, wherein the two or more sub-volumes have different resolutions.

15. The computer readable medium of claim 1, wherein the data volume includes two or more data volumes representing different modalities.

16. A computer readable medium embodying instructions executable by a processor to perform a method for aligning sub-volumes for visualization, comprising:

receiving a data volume;

providing a plurality of parameters of the sub-volumes;

determining a start point of each of the two or more sub-volume according to the plurality of parameters;

determining an amount of mis-alignment of the two or more sub-volumes;

shifting a start point of each sub-volume to align the start points with a grid of a virtual volume; and displaying the sub-volumes having aligned start points, wherein a region of interest in each sub-volume has identical voxel values.

17. The computer readable medium of claim 16, wherein providing the plurality of parameters comprises:

selecting a center point of each of two or more sub-volumes;

selecting a size and a shape of the two or more sub-volumes; and selecting a spacing between voxels in the two or more sub-volumes.

18. The computer readable medium of claim 17, the method further comprising converting the voxel-spacing to volume units.

19. The computer readable medium of claim 17, the method further comprising extracting the two or more sub-volumes from the volume, prior to displaying the sub-volumes, using the start points and the voxel spacing in volume units.

* * * * *